United States Patent
Gong

(10) Patent No.: US 11,557,155 B2
(45) Date of Patent: Jan. 17, 2023

(54) METHOD PERFORMED IN INTERNET OF VEHICLES DATA TRANSMISSION SYSTEM, ON-BOARD UNIT AND INTERNET OF VEHICLES DATA TRANSMISSION SYSTEM

(71) Applicant: BOE TECHNOLOGY GROUP CO., LTD., Beijing (CN)

(72) Inventor: Weibing Gong, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 362 days.

(21) Appl. No.: 16/623,627

(22) PCT Filed: Mar. 26, 2019

(86) PCT No.: PCT/CN2019/079649
§ 371 (c)(1),
(2) Date: Dec. 17, 2019

(87) PCT Pub. No.: WO2019/192350
PCT Pub. Date: Oct. 10, 2019

(65) Prior Publication Data
US 2020/0193730 A1    Jun. 18, 2020

(30) Foreign Application Priority Data

Apr. 2, 2018    (CN) .......................... 201810285689.5

(51) Int. Cl.
*G05D 1/00* (2006.01)
*G07C 5/00* (2006.01)
(Continued)

(52) U.S. Cl.
CPC ........... *G07C 5/008* (2013.01); *G08G 1/0112* (2013.01); *G08G 1/0116* (2013.01);
(Continued)

(58) Field of Classification Search
CPC ........ G07C 5/008; H04W 4/44; H04W 84/18; G08G 1/0112; G08G 1/0116; H04L 45/021; H04L 45/122
(Continued)

(56) References Cited

U.S. PATENT DOCUMENTS

2008/0095134 A1* 4/2008 Chen ..................... H04W 40/32
                                                        370/342
2010/0290378 A1* 11/2010 Wu ................... H04W 52/0216
                                                        370/311
(Continued)

FOREIGN PATENT DOCUMENTS

CN      102395111 A     3/2012
CN      102857991 A     1/2013
(Continued)

OTHER PUBLICATIONS

First Office Action for Chinese Application No. 201810285689.5, dated Mar. 4, 2020, 6 Pages.
(Continued)

*Primary Examiner* — Kerri L McNally
*Assistant Examiner* — Thang D Tran
(74) *Attorney, Agent, or Firm* — Brooks Kushman P.C.

(57) ABSTRACT

A method performed in an Internet of Vehicles data transmission system is provided in the present disclosure, where the Internet of Vehicles data transmission system includes a plurality of clusters and at least one road-side unit connected to the Internet, each cluster includes at least one on-board unit, and the at least one on-board unit includes a cluster head on-board unit, and the method includes: transmitting data in the on-board unit to one of the at least one road-side unit, via the cluster head on-board unit of the cluster where the on-board unit belongs. An on-board unit and an Internet of Vehicles data transmission system are further provided.

12 Claims, 4 Drawing Sheets

(51) Int. Cl.
*H04W 4/44* (2018.01)
*G08G 1/01* (2006.01)
*H04L 45/021* (2022.01)
*H04L 45/122* (2022.01)
*H04W 84/18* (2009.01)

(52) U.S. Cl.
CPC .......... *H04L 45/021* (2013.01); *H04L 45/122* (2013.01); *H04W 4/44* (2018.02); *H04W 84/18* (2013.01)

(58) Field of Classification Search
USPC .............................................................. 701/1
See application file for complete search history.

(56) References Cited

U.S. PATENT DOCUMENTS

| | | | |
|---|---|---|---|
| 2016/0142492 A1* | 5/2016 | Fang | H04B 1/3822 370/254 |
| 2016/0305794 A1* | 10/2016 | Horita | G06V 20/582 |
| 2017/0134080 A1* | 5/2017 | Rahman | H04L 5/0048 |
| 2018/0041922 A1* | 2/2018 | Chen | H04W 28/18 |
| 2018/0146471 A1* | 5/2018 | Xu | H04W 4/44 |
| 2018/0376525 A1* | 12/2018 | Feng | H04L 27/0014 |
| 2019/0037592 A1* | 1/2019 | Jung | H04W 36/03 |
| 2019/0089504 A1 | 3/2019 | Hwang et al. | |
| 2019/0104001 A1* | 4/2019 | Juliato | H04L 25/4917 |
| 2019/0182890 A1* | 6/2019 | Jeong | H04W 76/27 |
| 2019/0327588 A1* | 10/2019 | Gong | H04W 4/44 |
| 2020/0084738 A1* | 3/2020 | Nguyen | H04W 56/002 |
| 2020/0178043 A1* | 6/2020 | Cavalcanti | H04W 4/08 |
| 2020/0192603 A1* | 6/2020 | Tanriover | G06F 3/0659 |
| 2021/0191494 A1* | 6/2021 | Rotem | G06F 1/324 |

FOREIGN PATENT DOCUMENTS

| | | |
|---|---|---|
| CN | 103781198 A | 5/2014 |
| CN | 103957525 A | 7/2014 |
| CN | 105530663 A | 4/2016 |
| CN | 105744590 A | 7/2016 |
| CN | 105848295 A | 8/2016 |
| CN | 108616568 A | 10/2018 |
| CN | 108650657 A | 10/2018 |
| WO | 2017128275 A1 | 8/2017 |
| WO | 2017155275 A1 | 9/2017 |

OTHER PUBLICATIONS

International Search Report and Written Opinion for Application No. PCT/CN2019/079649, dated Jun. 3, 2019, 4 Pages.
Second Office Action for Chinese Application No. 201810285689.5, dated Aug. 18, 2020, 8 Pages.

* cited by examiner

METHOD PERFORMED IN INTERNET OF VEHICLES DATA TRANSMISSION SYSTEM, ON-BOARD UNIT AND INTERNET OF VEHICLES DATA TRANSMISSION SYSTEM

CROSS-REFERENCE TO RELATED APPLICATIONS

This application is the U.S. national phase of PCT Application No. PCT/CN2019/079649 filed on Mar. 26, 2019, which claims priority to Chinese Patent Application No. 201810285689.5 filed on Apr. 2, 2018, which are incorporated herein by reference in their entireties.

TECHNICAL FIELD

The present disclosure relates to the field of Internet of Vehicles technologies, and more particularly to a method performed in an Internet of Vehicles data transmission system, an on-board unit and an Internet of Vehicles data transmission system.

BACKGROUND

The Internet of Vehicles is a subdivision application of the Internet of Things in the automotive field. It is the only way for the mobile Internet and the Internet of Things to develop into the essence and depth of the business. It is a fusion technology for the future development of information communication, environmental protection, energy conservation and security.

The Internet of Vehicles is mainly composed of a road-side base station and a communication unit carried by the vehicle. The vehicle communicates with the outside world by using the communication unit, and the road-side base station serves as an access point for connecting to the Internet, and the communication unit connects to the road-side base station to access the Internet through wireless transmission. However, due to the cost, the deployment of road-side base stations on the current road may be sparse, which means that the deployment of base stations is not spatially dense or relatively large. Therefore, in this environment, most vehicles may not be able to communicate with the outside world.

SUMMARY

In a first aspect, a method performed in an Internet of Vehicles data transmission system is provided in the present disclosure, where the Internet of Vehicles data transmission system includes a plurality of clusters and at least one road-side unit connected to the Internet, each cluster includes at least one on-board unit, and the at least one on-board unit includes a cluster head on-board unit, and the method includes:

transmitting data in the on-board unit to one of the at least one road-side unit, via the cluster head on-board unit of the cluster where the on-board unit belongs.

It should be noted that, the cluster head on-board unit in the present disclosure refers to the on-board unit serving as the cluster head of the cluster, and the non-cluster head on-board unit in the present disclosure refers to the on-board unit not serving as the cluster head of the cluster. It should be appreciated that, when the Internet of Vehicles data transmission system includes only one road-side unit, the data in the on-board unit is transmitted to the road-side unit through the cluster head on-board unit. When the Internet of Vehicles data transmission system includes two or more road-side units, the data in the on-board unit is transmitted to the one of the two or more road-side units through the cluster head on-board unit. Similarly, when a cluster includes only one on-board unit, this on-board unit is the cluster head on-board unit of the cluster.

In some embodiments of the present disclosure, the transmitting the data in the on-board unit to one of the at least one road-side unit via the cluster head on-board unit of the cluster where the on-board unit belongs includes: determining whether the on-board unit is the cluster head on-board unit; in response to determining that the on-board unit is not the cluster head on-board unit, forwarding the data to the cluster head on-board unit of the cluster.

In some embodiments of the present disclosure, the cluster head on-board units of the plurality of clusters form a self-organizing network.

In some embodiments of the present disclosure, each on-board unit stores an intra-cluster on-board unit status table for the cluster where the each on-board unit belongs, the intra-cluster on-board unit status table includes status parameters of all on-board units in the cluster.

In some embodiments of the present disclosure, the status parameters of the on-board units include an identification number, an identity, a data processing capability and a data forwarding capability of each on-board unit, a speed of a vehicle where each on-board unit belongs and a distance between the each on-board unit and a nearest road-side unit.

In some embodiments of the present disclosure, the determining whether the on-board unit is the cluster head on-board unit includes: determining whether the on-board unit is the cluster head on-board unit by accessing the intra-cluster on-board unit status table.

In some embodiments of the present disclosure, one of the plurality of clusters includes a plurality of on-board units, and a non-cluster head on-board unit in the plurality of on-board units is reselected as the cluster head on-board unit of the cluster based on the status parameters and according to a new cluster head selection probability.

In some embodiments of the present disclosure, the new cluster head selection probability is determined according to the following equation:

$$\sigma_i = \gamma \frac{P_{c_i} T_{c_i}}{D_{v_i r}(\alpha + (S_i - S_{avg})^2)},$$

$$P_i = \frac{\sigma_i^k}{\sum_i (\sigma_i^k)},$$

where $P_i$ represents a new cluster head selection probability of reselecting an intra-cluster on-board unit i to be a cluster head on-board unit, $\sigma_i$ represents a state metric of the intra-cluster on-board unit i, $\alpha$ and $\gamma$ are constants not being zero, $P_{c_i}$ represents a data processing capability of the on-board unit i, $T_{c_i}$ represents a data forwarding capability of the on-board unit i, $D_{v_i r}$ represents a distance between the on-board unit i and a nearest road-side unit, $S_i$ represents a speed of a vehicle where the on-board unit i belongs, and $S_{avg}$ represents an average speed of the vehicles where all the vehicle units belong in the cluster where the on-board unit i belongs.

In some embodiments of the present disclosure, the cluster head on-board unit of each cluster includes a routing table and a surrounding cluster head status table, where the routing table includes at least one routing entry, each routing entry includes a destination and a next hop node, and the surrounding cluster head status table includes an identification number, a data processing capability, a data forwarding capability of each surrounding cluster head on-board unit, a speed of a vehicle where each surrounding cluster head on-board unit belongs, a distance between each surrounding cluster head on-board unit and at least one road-side unit and a congestion degree of each surrounding cluster head on-board unit.

In some embodiments of the present disclosure, the method includes: in response to determining that the on-board unit is the cluster head on-board unit, searching the routing table to determine whether the routing table includes the routing entry where the destination is a road-side unit of the at least one road-side unit; in response to determining that the routing table includes the routing entry where the destination is the road-side unit of the at least one road-side unit, determining whether the routing entry includes an entry where the next hop node is one of the at least one road-side unit; and in response to determining that the routing entry includes the routing entry where the next hop node is one of the at least one road-side unit, forwarding data to the road-side unit.

In some embodiments of the present disclosure, the method includes: in response to determining that the routing table does not include the routing entry where the destination is the road-side unit of the at least one road-side unit, transmitting a routing request to establish the routing table.

In some embodiments of the present disclosure, the method includes: in response to determining that the routing entry does not include the routing entry where the next hop node is one of the at least one road-side unit, selecting the cluster head on-board unit taken as the next hop node, based on the routing entry and according to a next hop selection probability.

In some embodiments of the present disclosure, the routing table further includes a routing metric corresponding to the cluster head on-board unit taken as the next hop node, the routing metric is determined according to the following equation:

$$\delta_j = \lambda \frac{P_{cj} T_{cj}}{D_{v_{jr}} C_j (\tau + (S_j - S_c)^2)},$$

where $\delta_j$ represents a routing metric corresponding to a cluster head on-board unit j taken as the next hop node, $\lambda$ and $\tau$ are constants not being zero; $P_{cj}$ and $T_{cj}$ respectively represent a data processing capability and a data forwarding capability of the cluster head on-board unit j; $D_{v_{jr}}$ represents a distance between the cluster head on-board unit j and a road-side unit to be reached through the cluster head on-board unit j, $C_j$ represents a congestion degree of the cluster head on-board unit j, $S_j$ represents a vehicle speed of the cluster head on-board unit j, and $S_c$ represents a speed of a vehicle where a current cluster head on-board unit belongs.

In some embodiments of the present disclosure, the next hop selection probability is determined by the following equation:

$$P_j = \frac{\delta_j^k}{\sum_j \delta_j^k},$$

where $P_j$ represents a probability of selecting the cluster head on-board unit j taken as the next hop to be a next hop node where data is to be forwarded, $\delta_j$ is a routing metric corresponding to the cluster head on-board unit j, and k is a constant not being zero.

In a second aspect, an on-board unit is provided in the present disclosure, including: a radio transceiver configured to receive and send data; a memory storing computer-executable instructions; and a processor configured to execute the computer-executable instructions to perform the method hereinabove.

In a third aspect, an Internet of Vehicles data transmission system is provided in the present disclosure, including a plurality of clusters and at least one road-side unit connected to the Internet, each cluster includes at least one on-board unit hereinabove, and the at least one on-board unit includes a cluster head on-board unit.

According to the embodiments of the present disclosure, the advantages of the present disclosure will become apparent, which will be illustrated in the embodiments in the following description.

BRIEF DESCRIPTION OF THE DRAWINGS

The embodiments of the present disclosure will now be described in more detail and with reference to the drawings.

DETAILED DESCRIPTION

The following description provides specific details for the various embodiments of the disclosure. Those skilled in the art will appreciate that the technical solutions of the present disclosure may be practiced without many of these details. In other instances, well-known structures and functions are not shown or described in detail to avoid obscuring the description of the embodiments of the present disclosure. The terms used in the present disclosure are to be understood in the broadest sense of the embodiments of the disclosure, even if they are used in conjunction with the detailed description of the embodiments of the present disclosure. For example, the term "based on or in response to" is not exclusive and is equivalent to the term "based at least in part or in response to" and includes additional factors based on some of which are not described herein.

Figure 1:
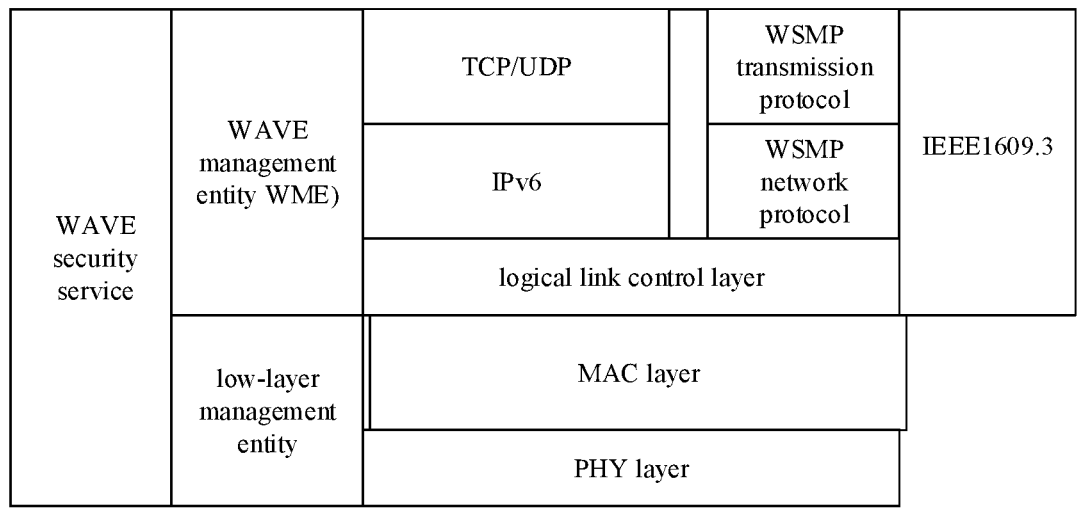
FIG. 1 is a WAVE protocol stack suitable for use in an Internet of Vehicles in the related art.

FIG. 1 is a Wireless Access in Vehicular Environments (WAVE) protocol stack suitable for use in an Internet of Vehicles in the related art. As shown in FIG. 1, the physical (PHY) layer and medium access control (MAC) layer of WAVE are performed based on IEEE802.11p, and IEEE802.11p is a modification of IEE802.11a to adapt to the rapidly changing Internet of Vehicles environment. The upper layer of the WAVE protocol stack uses the IEEE 1609 series of standards, which include IEEE 1609.1, IEEE 1609.2, IEEE 1609.3, and IEEE 1609.4. IEEE 1609.4 provides enhanced functionality for IEEE 802.11p used in the MAC layer to support multi-channel operation. TFEE 1609.3 specifies the functions of the logical link control layer, the network layer, and the transmission layer. IEEE 1609.2 specifies the format of security messages and their encryption and decryption processes (which are related to the security services and management entities on the left side of FIG. 1). IEEE 1609.1 defines a remote management application between a resource manager and a remote device, which is related to the application layer above the transmission layer (the layer where the TCP, UDP, WSMP (WAVE Short Message Protocol) transport protocol is located) in FIG. 1 (not shown).

Figure 2:
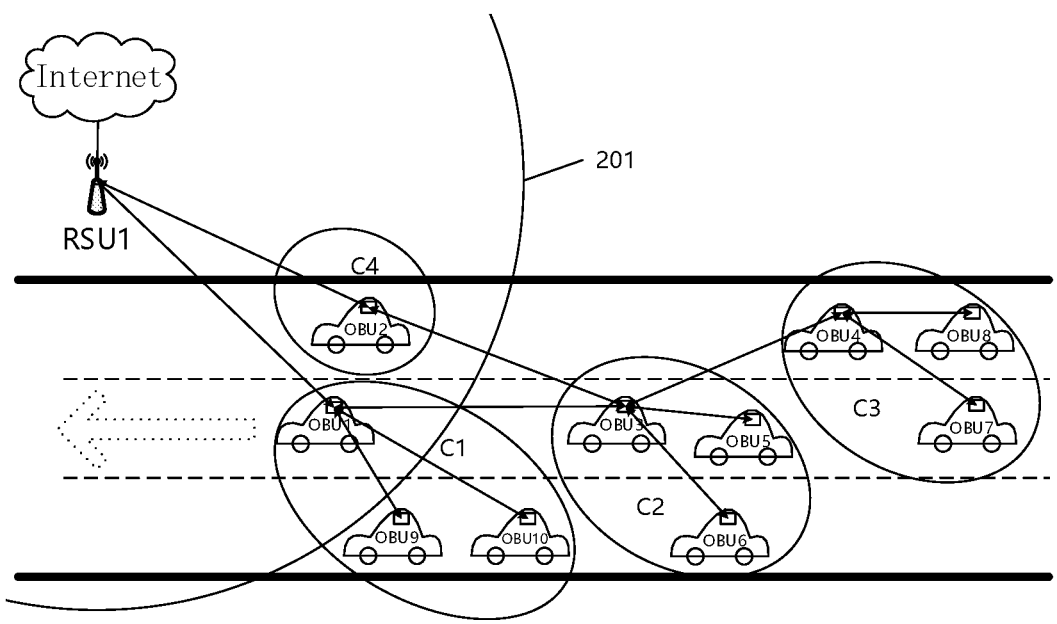
FIG. 2 is a schematic view of an Internet of Vehicles transmission system in some embodiments of the present disclosure.

FIG. 2 is a schematic view of an Internet of Vehicles transmission system in some embodiments of the present disclosure. The Internet of Vehicles transmission system includes a plurality of clusters and at least one Road-Side Unit (RSU) connected to the Internet. Each cluster includes at least one On-Board Unit (OBU) and has a cluster head OBU, which is one of the at least one on-board unit. Four clusters C1, C2, C3, C4 and one road-side unit RSU1 are illustrated in FIG. 2 As shown in FIG. 2, the cluster C1 includes on-board units OBU1, OBU9, OBU10 carried by three adjacent vehicles, where OBU1 is the cluster head OBU of cluster C1. The cluster C2 includes on-board units OBU3, OBU5, OBU6 carried by three adjacent vehicles, where OBU3 is the cluster head OBU of the cluster C2. The cluster C3 includes on-board units OBU4, OBU7, OBU8 carried by three adjacent vehicles, where OBU4 is the cluster head OBU of the cluster C3. The cluster C4 includes only one on-board unit OBU2 carried by a single vehicle, where OBU2 is also the cluster head OBU of the cluster C4. It should be noted that the number of clusters mentioned above and the data of the on-board unit included in each cluster are not limited.

The cluster head OBU in each cluster is responsible for receiving data of the intra-cluster OBU (OBU included in the cluster) of the cluster in which the cluster head OBU is located and forwarding the data to the RSU or other cluster head OBU. In other words, all cluster head OBUs are communicatively coupled to form a traffic forwarding layer, and all non-cluster head OBUs (i.e., the on-board units that do not act as cluster head OBUs) form a traffic collection layer. The traffic forwarding layer composed of the cluster head OBUs is essentially a self-organizing network (for example, an AD HOC network), which can adopt various self-organizing network protocols. Each cluster head may run the self-organizing network protocol. Each terminal in the self-organizing network has both the router and host functions. As a host, the terminal may run various applications. As a router, the terminal may run the corresponding routing protocol. The self-organizing networks may provide mutual communication between terminals when the existing network infrastructure (e.g., base stations) is not used or is inconvenient to be used. In this way, nodes in the network may move freely and communicate with each other in any way, thereby increasing the flexibility of network establishment and preventing the occurrence of communication holes. An OBU cannot be both a cluster head OBU of one cluster and a non-cluster head OBU of another cluster at the same time. In the scenario shown in FIG. 2, any on-board unit eventually connects to the Internet by accessing RSU1 through the cluster head OBU1 or OBU2 within the RSU1 wireless communication range. In FIG. 2, the communication range of RSU1 is defined by a circle 201 (only half a circle is shown), and OBU1 and OBU2 being located within circle 201 indicates that OBU1 and OBU2 are within the RSU1 wireless communication range.

Each on-board unit OBU may store an intra-cluster OBU status table for the cluster where the on-board unit belongs, the intra-cluster OBU status table includes status parameters of all OBUs within the cluster. An on-board unit may periodically broadcast a HELLO packet to an on-board unit nearby (i.e., within its communication range), and the HELLO packet may include status parameters of the on-board unit.

In this way, each on-board unit OBU may know the status parameters of all OBUs within the cluster where the on-board unit belongs. The status parameters may include, for example, an OBU identification number, an OBU identity, a data processing capability, a data forwarding capability, a vehicle speed of the vehicle in which the OBU is located, and a distance from the vehicle to the nearest RSU. Optionally, the status parameter table may further include a distance to the cluster head OBU, to facilitate the cluster head OBU to manage the members in the cluster. For example, the on-board unit OBU which is spaced apart from the cluster head OBU by a distance exceeding a certain threshold may be deleted from the cluster. The vehicle speed of the vehicle may be directly obtained by means of a GPS receiver, an inertial sensor, etc., and the distance to the nearest RSU may be calculated by means of positioning information of both parties (acquired by a GPS receiver). The OBU identification number is used to uniquely identify the on-board unit (which may be the IP address of the OBU), and the OBU identity indicates that the OBU is an intra-cluster OBU (i.e., a member) or a cluster head OBU. Table 1 exemplarily shows such intra-cluster OBU status table.

TABLE 1 intra-cluster OBU status table

| OBU identification number | OBU identity | processing capability | forwarding capability | speed | distance to RSU | distance to cluster head |
|---|---|---|---|---|---|---|
| OBU1 ID | cluster head/member | processing capability 1 | forwarding capability 1 | speed 1 | distance 1 to RSU | distance 1 to cluster head |
| OBU2 ID | cluster head/member | processing capability 2 | forwarding capability 2 | speed 2 | distance 2 to RSU | distance 2 to cluster head |
| . . . | | | | . . . | . . . | . . . |
| OBUn ID | cluster head/member | processing capability n | forwarding capability n | speed n | distance n to RSU | distance n to cluster head |

Within a cluster, the cluster head OBU is crucial and it is responsible for managing the members of the cluster and implementing the addition and deletion of member OBUs. In order to achieve effective management of members in the cluster, all member OBUs in the cluster must be within the wireless communication range of the cluster head OBU. In general, the adjacent vehicles mentioned above are vehicles traveling in the same direction within a certain range. Because the overtaking on the road is only an individual phenomenon within a certain distance and time range, the vehicle carrying the OBU in the cluster and the vehicle carrying the cluster head OBU remain substantially unchanged distance between each other for a certain period of time, which is advantageous for the technical solution of the present disclosure. In a vehicle traveling in the same direction, a certain number of OBUs carried by adjacent vehicles form a cluster, and an OBU is selected as a cluster head. Typically, within a cluster, the OBUs close to the RSU will first be selected as the cluster head OBU, which may be determined by the strength of the communication signals or the distance between each other. Generally, an OBU that is about to enter the RSU wireless communication range directly selects an OBU within the RSU communication range as a cluster head, and an OBU that is far away from the RSU wireless communication range selects an OBU that is closer to the RSU communication range as a cluster head. For example, it is possible to determine the distance to the RSU wireless communication range by using the distance determined by the GPS receiver, which is of course not limited.

In some embodiments, the cluster head OBU may be reselected. For example, in the case where a new member joins the cluster, the cluster head fails, the vehicle where the cluster head belongs is out of the communication range of the current cluster, or there is an on-board unit OBU that is more suitable to be the cluster head than the current cluster head OBU, the cluster head OBU may be reselected. As an example, the cluster head may be selected based on the status parameters described above. For example, the cluster head OBU first determines a more suitable cluster head OBU according to the status parameters included in the intra-cluster OBU status table, and then sends a cluster change message to each intra-cluster OBU to notify that a more suitable cluster head OBU will be selected as new cluster head OBU. After receiving the cluster head change message, each OBU in the cluster must send an acknowledgement message to the current cluster head node. After the current cluster head OBU receives the confirmation message of each member, it no longer receives the data that needs to be forwarded to the RSU via the cluster head OBU, and the data that needs to be transmitted to the Internet itself needs to be handed over to the new cluster head OBU. The selected new cluster head will also receive the message from the original cluster, and from the moment the message is received, it will begin to perform the duties of the cluster head. The message may also include routing table information for the original cluster head, which is not limited. In this way, it is advantageous to select an on-board unit that is most suitable to be a cluster head. As an example, a new cluster head may be selected by means of a state metric of the intra-cluster OBU described by equation (1) below, which is of course not limited.

In some embodiments of the present disclosure, a state metric for an intra-cluster OBU may be determined based on status parameters in an intra-cluster OBU status table that indicates how well the OBU is suitable as a cluster head OBU. Equation (1) shows how to determine the state metric of the OBU in each cluster based on the status parameters in the intra-cluster OBU status table:

$$\sigma_i = \gamma \frac{P_{c_i} T_{c_i}}{D_{v_i r}(\alpha + (S_i - S_{avg})^2)} \quad \text{equation (1)}$$

where σi represents the state metric of OBU i, α and γ are constants not being zero, $P_{c_i}$ represents a data processing capability of the OBU i, $T_{c_i}$ represents a data forwarding capability of the OBU t, $D_{v_i r}$ represents a distance between the OBU i and a nearest RSU, $S_i$ represents a speed of a vehicle where the OBU i belongs, and $S_{avg}$ represents an average speed of the vehicles where all the vehicle units belong in the cluster where the OBU belongs.

It can be seen that as an on-board unit OBU, the stronger the data processing capability $P_{c_i}$ and forwarding capability $T_{c_i}$ are, the better it is suitable to be a cluster head. The closer to the RSU, i.e., the smaller the $D_{v_i r}$, the stronger the signal on the OBU and the higher the data forwarding efficiency will be. The speed of the vehicle where the cluster head is located should be closer to the average speed of all members in the cluster, so as to receive data from all other members in a larger range. The cluster head OBU may directly obtain the values of $P_{c_i}$, $T_{c_i}$ an d $S_i$ required in the equation (1) according to the OBU status table in the cluster, and the average vehicle speed $S_{avg}$ may also be obtained by calculation.

Since the change of the cluster head OBU needs to send a change message, it also consumes network resources, the reselection of the cluster head should not be too frequent. By means of probability selection, the number of times changing the cluster head may be reduced to some extent.

As described above, the intra-cluster OBU status table may be continuously updated through the HELLO packet. The cluster head OBU may calculate the state metric of each intra-cluster OBU according to equation (1). Then, a new cluster head may be selected according to equation (2), and equation (2) is shown as follows:

$$P_i = \frac{\sigma_i^k}{\sum_i (\sigma_i^k)} \quad \text{equation (2)}$$

where $P_i$ represents a new cluster head selection probability of reselecting an intra-cluster OBU i to be a new cluster head, $\sigma_i$ represents a state metric of the OBU i, k is a constant not being zero.

In some embodiments, the cluster head OBU may also store a routing table and a surrounding cluster head status table. The routing table may include at least one routing entry, each routing entry including a destination and a next hop node. The surrounding cluster head status table may include an identification number, a data processing capability, a data forwarding capability of each surrounding cluster head OBU, a speed of a vehicle where each surrounding cluster head OBU belongs, a distance between each surrounding cluster head OBU and at least one RSU and a congestion degree of each surrounding cluster head OBU.

In the Internet of Vehicles, since the relative position of the vehicle may remain unchanged within a certain period of time, the cluster head OBU may use a table-driven routing protocol to establish the routing table, which is of course not limited, and an ODR-On Demand Routing may also be considered. A table-driven routing protocol is typically a network layer routing protocol, or the routing protocol utilizing a network layer protocol and implemented in other layers, which is not limited. A table-driven routing protocol is also known as an active routing protocol or a priori routing protocol. The principle is that each node maintains a routing table containing routing information of the arriving nodes. Once the source node needs to send a message, it can immediately obtain the route to the destination node. When the network topology changes, the routing table information is updated and the update message is transmitted throughout the network. The table-driven routing protocol may be, for example, a Destination Sequenced Distance Vector (DSDV), which is not limited. In a table-driven routing protocol, a routing table between network nodes is established by broadcasting routing requests in advance in a self-organizing network, and then the routing is updated in real time by means of a HELLO packet. In this embodiment, the cluster head OBU implements the route update through the HELLO packet.

Figure 5:
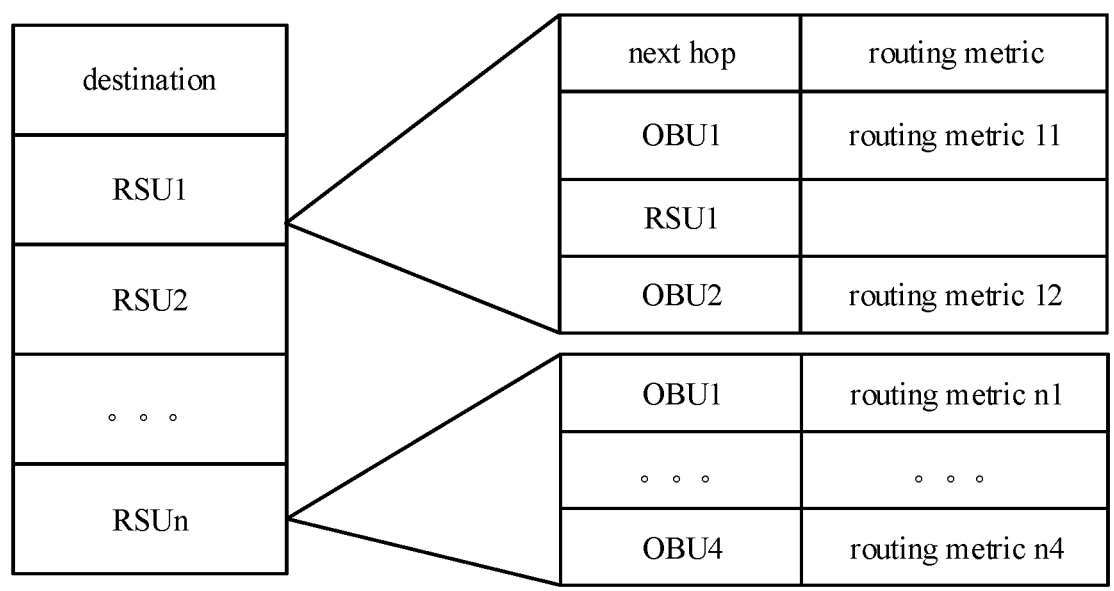
FIG. 5 shows a routing table for a cluster head in which there is a routing metric corresponding to the cluster head OBU in the case that the next hop of the destination is the cluster head OBU in some embodiments of the present disclosure.

When the next hop is selected in the case of establishing a route or the next hop is selected in the case where there is a multipath, the routing metric corresponding to the cluster head node may be utilized to implement the routing selection. The routing metric characterizes how well the cluster head node is suitable to be the next hop node, and the path with the largest routing metric is the optimal path. FIG. 5 shows an exemplary routing table for a cluster head in which there is a routing metric corresponding to the cluster head OBU in the case that the next hop of the destination is the cluster head OBU. The destination is the RSU that can be reached via the cluster head. In the embodiments of the present disclosure, a routing table typically only includes one routing entry where the next hop node is an RSU, since the RSUs in the present disclosure are very sparse.

Each cluster head may also maintain a surrounding cluster head status table. The surrounding cluster head status table is as follows:

TABLE 2

3-surrounding cluster head status table

| cluster head identification number | processing capability | forwarding capability | speed | distance to RSU | congestion degree |
|---|---|---|---|---|---|
| cluster head 1 ID | processing capability 1 | forwarding capability 1 | speed 1 | distance 1 to RSU | congestion degree 1 |
| cluster head 2 ID | processing capability 2 | forwarding capability 2 | speed 2 | distance 2 to RSU | congestion degree 2 |
| ... | ... | ... | ... | ... | ... |
| cluster head n ID | processing capability n | forwarding capability n | speed n | distance n to RSU | congestion degree n |

As mentioned above, the next hop node may be an RSU or a cluster head. When a certain cluster head selects a cluster head to be a next hop node where the data is to be forwarded, the cluster head may select a cluster head to be a next hop node (i.e., a next hop node cluster head) based on the routing entry and according to a certain selection probability. For example, the cluster head (i.e., the next hop cluster head) to be the next hop node may be selected based on a certain probability and according to the size of the routing metric of each path in the routing table. The routing metric corresponding to each cluster head as the next hop node (i.e., the next hop cluster head) may be calculated according to the following equation (3):

$$\delta_j = \lambda \frac{P_{c_j} T_{c_j}}{D_{v_j r} C_j (\tau + (S_j - S_c)^2)}, \quad \text{equation (3)}$$

where $\delta_j$ represents a routing metric corresponding to a cluster head OBU j taken as the next hop node, $\lambda$ and $\tau$ are constants not being zero; $P_{c_j}$ and $T_{c_j}$ respectively represent a data processing capability and a data forwarding capability of the cluster head OBU j; $D_{v_j r}$ represents a distance between the cluster head OBU j and a RSU (the destination in the routing table corresponding to this cluster head OBU j) to be reached through the cluster head OBU j, $C_j$ represents a congestion degree of the cluster head OBU j, $S_j$ represents a vehicle speed of the cluster head OBU j, and $S_c$ represents a speed of a vehicle where a current cluster head OBU belongs.

It can be seen that the cluster head OBU with stronger data processing capability and forwarding capability is more suitable to be the next hop node. At the same time, the closer the next hop cluster head is to the RSU that is to be reached through the cluster head, that is, the smaller the $D_{v_j r}$ is, the stronger the signal and the higher the forwarding efficiency may be.

The higher the congestion degree of the next hop cluster head is, the lower the forwarding efficiency thereof will be. The closer the vehicle speed of the next hop cluster head is to the vehicle speed of the current cluster head may be, the longer the connection with the current cluster head will be, and the more stable the transmission will be.

In the case that there are a plurality of next hop cluster heads, when selecting the next hop cluster head where the data is forwarded, the routing metric corresponding to each next hop cluster head OBU may be obtained according to equation (3), the next hop selection probability of selecting the next hop cluster head is calculated according to equation (4). Then, the next hop head where the data is to be forwarded is selected according to the next hop selection probability. By means of probability selection, the burden of forwarding data by the cluster head may be reduced to some extent.

$$P_j = \frac{\delta_j^k}{\sum_j \delta_j^k}, \quad \text{equation (4)}$$

where $P_j$ represents a probability of selecting the cluster head OBU j taken as the next hop to be a next hop node where data is to be forwarded, $\delta_j$ is a routing metric corresponding to the cluster head OBU j, and k is a constant not being zero.

Figure 3:
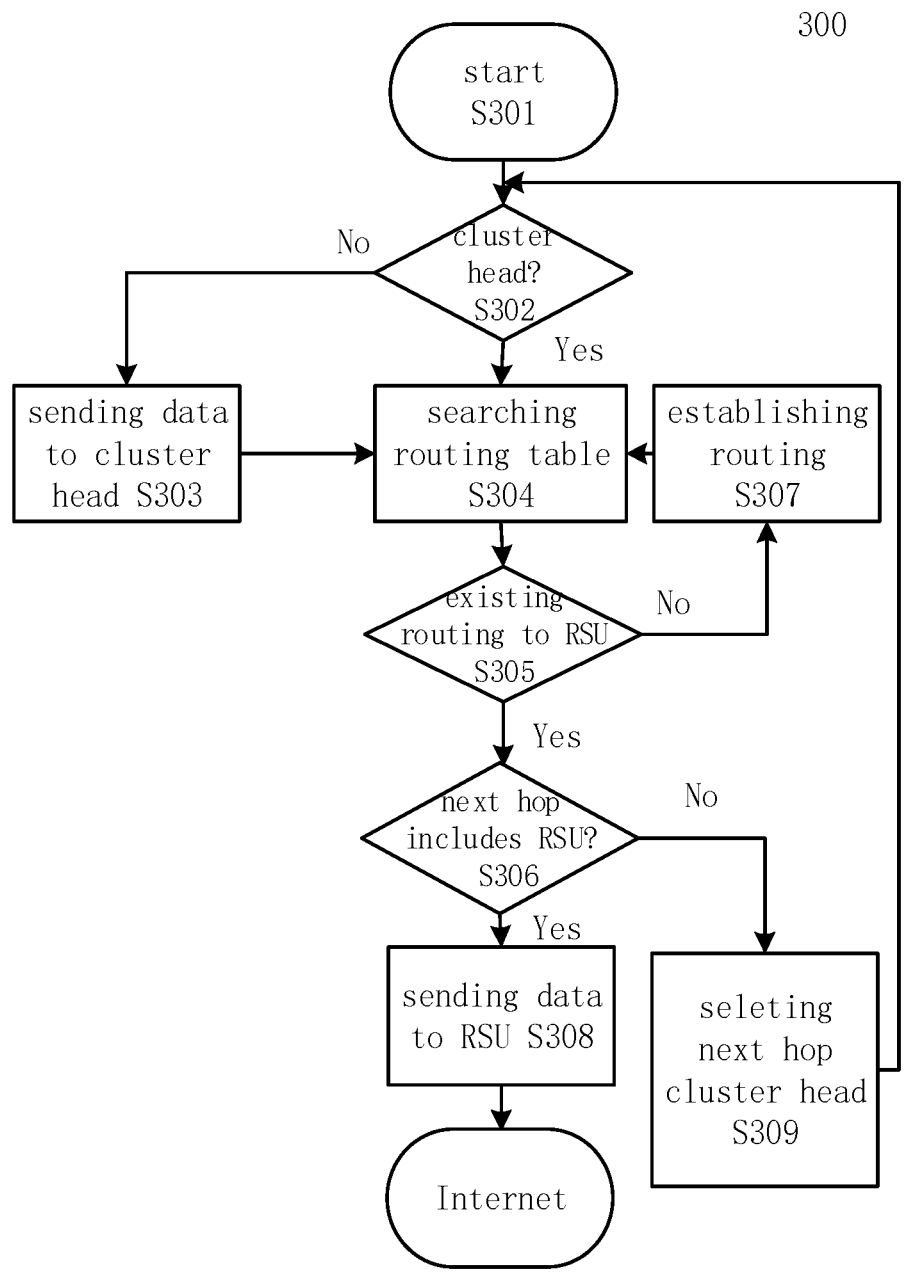
FIG. 3 is a flow chart of a method performed in an Internet of Vehicles data transmission system in some embodiments of the present disclosure.

The working principle of the Internet of Vehicles transmission system described in the above embodiment will be explained below with reference to FIG. 3. FIG. 3 is a flow chart of a method 300 performed in an Internet of Vehicles data transmission system in some embodiments of the present disclosure.

When an on-board unit OBU starts transmitting data to the Internet (S301), it is first determined whether the on-board unit OBU is a cluster head OBU (S302). This can be determined, for example, by the on-board unit OBU accessing its stored intra-cluster OBU status table. In response to determining that the on-board unit OBU is not a cluster head OBU, the data is forwarded to the cluster head OBU of the cluster where the OBU belongs (S303). In response to determining that the OBU is a cluster head OBU, a routing table is looked up (S304) to determine whether the routing table includes a routing entry destined for one of the at least one road-side unit RSU (S305). In response to determining that the routing table includes the routing entry where the destination is the road-side unit of the at least one road-side unit, determining whether the routing entry includes an entry where the next hop node is one of the at least one RSU (S306). Instead, in response to determining that the routing table does not include the routing entry where the destination is the road-side unit of the at least one road-side unit, transmitting a routing request to establish the routing table (S307). The routing table can be established using a table driven routing protocol. In response to determining that the routing table includes the routing entry where the destination is the road-side unit of the at least one road-side unit, determining whether the routing entry includes an entry where the next hop node is one of the at least one road-side unit (S308). In response to determining that the routing entry does not include the routing entry where the next hop node is one of the at least one road-side unit, selecting the cluster head on-board unit taken as the next hop node, based on the routing entry and according to a next hop selection probability (S309). For example, the next hop selection probability can be calculated, for example, using equations (3) and (4). As an example, there are paths (i.e., n paths) with n (n is a positive integer greater than or equal to 2) cluster heads OBU as the next hop node in the routing table, and the next hop selection probabilities for the n cluster head OBUs are calculated as P1, P2, . . . , Pn, respectively, and in the case that the routing entry does not include the routing entry where the next hop node is one of the at least one RSU, the first cluster head is selected to be the next hop node according to probability P1, the second cluster head is selected to be the next hop node according to probability P2 (and so on), and the $n^{th}$ cluster head is selected to be the next hop node according to probability Pn. Then, the above execution process is continued by the next hop cluster head OBU to transfer the data to the appropriate RSU, thereby transmitting the data to the Internet. It should be noted that the methods described above may be performed, for example, in the network layer of the WAVE protocol stack shown in FIG. 1.

Figure 4:
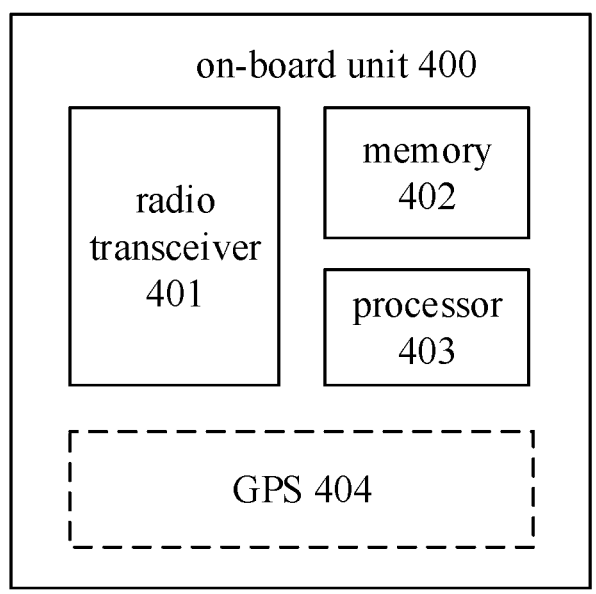
FIG. 4 is a schematic view of an on-board unit in an Internet of Vehicles transmission system in some embodiments of the present disclosure.

FIG. 4 is a schematic view of an on-board unit 400 in an Internet of Vehicles transmission system in some embodiments of the present disclosure. As shown in FIG. 4, the on-board unit 400 can include a radio transceiver 401 configured to receive and transmit data, a memory 402 storing computer-executable instructions, and a processor 403 configured to execute the computer-executable instructions to perform the method illustrated in FIG. 3.

Wireless transceiver 401 typically includes a wireless transmitter and a wireless receiver. The radio transceiver can be, for example, a radio frequency transceiver, a radio transceiver, or the like. The radio transceiver 401 can be configured to transmit data to other on-board units or RSUs, and/or receive data from other on-board units or RSUs. The data may for example be the HELLO package described above.

Memory 402 may include one or more non-transitory storage media including, for example, magnetic disks (fixed, floppy, and removable) and magnetic tape, optical media such as CD-ROM and digital video disk (DVD), and such as electrical A semiconductor memory device that programs read only memory (EPROM) and electrically erasable programmable read only memory (EEPROM). Memory 402 can be used for computer program instructions or code that is tangibly retained in one or more modules and written in any desired computer programming language. Such computer program instructions or code may, when executed by, for example, processor 403, implement one or more of the methods described above.

The processor 403 can execute or control the instructions required by many of the functions performed by the on-board unit. Processor 403 includes other logic devices performed in hardware as application specific integrated circuits or using one or more semiconductors. The processor is not limited by the materials it forms or the processing mechanisms employed therein. For example, a processor can be comprised of semiconductor(s) and/or transistors (e.g., an electronic integrated circuit (IC)). The processor may be, for example, a system on a chip, such as those found in mobile devices, and may also include a dedicated graphics processing unit (GPU). Processor 403 may be based on a Reduced Instruction Set Computer (RISC) or Complex Instruction Set Computer (CISC) architecture or any other suitable architecture, and may include one or more processing units or cores.

It should be noted that the on-board unit illustrated in FIG. 4 is merely exemplary and not limiting. Additionally, the on-board unit may also include a GPS module 404 or the like, which may be, for example, a GPS receiver that can receive global positioning system satellite signals and determine ground space locations. As described above, with the GPS module, the positioning information of the on-board unit or the road-side unit can be determined, so that the distance between the on-board unit or the on-board unit and the road-side unit can be obtained, and the vehicle speed of the vehicle can be obtained. Alternatively, the on-board unit may also utilize data provided by a GPS module that is provided by the vehicle, which may be integrated, for example, on a center control panel of the vehicle.

In summary, in the technical solution described in the present disclosure, all cluster head OBUs are communicatively connected to form a traffic forwarding layer, and all non-cluster head OBUs constitute a traffic collection layer, thereby implementing hierarchical routing of data in the Internet of Vehicles transmission system. By means of the hierarchical routing, stable transmission of data can be achieved even in an Internet of Vehicles in which the RSUs are relatively sparse.

It should be understood that the embodiments of the present disclosure have been described with reference to various functional units for clarity. However, it will be apparent that the functionality of each functional unit may be performed in a single unit, performed in a plurality of units, or performed as part of other functional units without departing from the disclosure. For example, functionality illustrated to be performed by a single unit can be performed by a plurality of different units. Therefore, references to specific functional units are only to be considered as a reference to the appropriate elements for providing the described functionality, rather than a strict logical or physical structure or organization. Accordingly, the present disclosure may be performed in a single unit or may be physically and functionally distributed between different units and circuits.

Although the present disclosure has been described in connection with some embodiments, it is not intended to be limited to the specific forms set forth herein. Instead, the scope of the disclosure is limited only by the appended claims. Additionally, although individual features may be included in different claims, these may be advantageously combined, and the combination of the features is not implied and/or advantageous in the different claims. The order of the features in the claims does not imply that the features must be in any particular order in which they function. In addition, the word "comprising" does not exclude the s The reference signs in the claims are only provided as an example, and are not intended to limit the scope of the claims in any way.

What is claimed is:

1. A method performed in an Internet of Vehicles data transmission system, wherein the Internet of Vehicles data transmission system comprises a plurality of clusters and at least one road-side unit connected to the Internet, each cluster comprises at least one on-board unit, and the at least one on-board unit comprises a cluster head on-board unit, and the method comprises:

transmitting data in the on-board unit to one of the at least one road-side unit, via the cluster head on-board unit of the cluster where the on-board unit belongs, wherein the transmitting the data in the on-board unit to one of the at least one road-side unit via the cluster head on-board unit of the cluster where the on-board unit belongs comprises: determining whether the on-board unit is the cluster head on-board unit in response to determining that the on-board unit is not the cluster head on-board unit, forwarding the data to the cluster head on-board unit of the cluster, wherein each on-board unit stores an intra-cluster on-board unit status table for the cluster where the each on-board unit belongs, the intra-cluster on-board unit status table comprises status parameters of all on-board units in the cluster, wherein one of the plurality of clusters comprises a plurality of on-board units, and a non-cluster head on-board unit in the plurality of on-board units is reselected as the cluster head on-board unit of the cluster based on the status parameters and according to a new cluster head selection probability, wherein the new cluster head selection probability is determined according to the following equation:

$$\sigma_i = \gamma \frac{P_{c_i} T_{c_i}}{D_{v_i r}(\alpha + (S_i - S_{avg})^2)},$$

$$P_i = \frac{\sigma_i^k}{\sum_i (\sigma_i^k)},$$

where $P_i$ represents a new cluster head selection probability of reselecting an intra-cluster on-board unit i to be a cluster head on-board unit, $\sigma_i$ represents a state metric of the intra-cluster on-board unit i, $\alpha$ and $\gamma$ are constants not being zero, $P_{c_i}$ represents a data processing capability of the on-board unit i, $T_{c_i}$ represents a data forwarding capability of the on-board unit i, $D_{v_i r}$ represents a distance between the on-board unit i and a nearest road-side unit, $S_i$ represents a speed of a vehicle where the on-board unit i belongs, and $S_{avg}$ represents an average speed of the vehicles where all the vehicle units belong in the cluster where the on-board unit i belongs.

2. The method according to claim 1, wherein the cluster head on-board units of the plurality of clusters form a self-organizing network.

3. The method according to claim 1, wherein the status parameters of the on-board units comprise an identification number, an identity, a data processing capability and a data forwarding capability of each on-board unit, a speed of a vehicle where each on-board unit belongs and a distance between the each on-board unit and a nearest road-side unit.

4. The method according to claim 3, wherein the determining whether the on-board unit is the cluster head on-board unit comprises: determining whether the on-board unit is the cluster head on-board unit by accessing the intra-cluster on-board unit status table.

5. The method according to claim 1, wherein the cluster head on-board unit of each cluster comprises a routing table and a surrounding cluster head status table, wherein the routing table comprises at least one routing entry, each routing entry comprises a destination and a next hop node, and the surrounding cluster head status table comprises an identification number, a data processing capability, a data forwarding capability of each surrounding cluster head on-board unit, a speed of a vehicle where each surrounding cluster head on-board unit belongs, a distance between each surrounding cluster head on-board unit and at least one road-side unit and a congestion degree of each surrounding cluster head on-board unit.

6. The method according to claim 5, comprising:

in response to determining that the on-board unit is the cluster head on-board unit, searching the routing table to determine whether the routing table comprises the routing entry where the destination is a road-side unit of the at least one road-side unit;

in response to determining that the routing table comprises the routing entry where the destination is the road-side unit of the at least one road-side unit, determining whether the routing entry comprises an entry where the next hop node is one of the at least one road-side unit; and in response to determining that the routing entry comprises the routing entry where the next hop node is one of the at least one road-side unit, forwarding data to the road-side unit.

7. The method according to claim 6, comprising:

in response to determining that the routing table does not comprise the routing entry where the destination is the road-side unit of the at least one road-side unit, transmitting a routing request to establish the routing table.

8. The method according to claim 6, comprising:

in response to determining that the routing entry does not comprise the routing entry where the next hop node is one of the at least one road-side unit, selecting the cluster head on-board unit taken as the next hop node, based on the routing entry and according to a next hop selection probability.

9. The method according to claim 8, wherein the routing table further comprises a routing metric corresponding to the cluster head on-board unit taken as the next hop node, the routing metric is determined according to the following equation:

$$\delta_j = \lambda \frac{P_{c_j} T_{c_j}}{D_{v_j r} C_j (\tau + (S_j - S_c)^2)},$$

wherein $\delta_j$ represents a routing metric corresponding to a cluster head on-board unit j taken as the next hop node, $\lambda$ and $\tau$ are constants not being zero; $P_{c_j}$ and $T_{c_j}$ respectively represent a data processing capability and a data forwarding capability of the cluster head on-board unit j; $D_{v_j r}$ represents a distance between the cluster head on-board unit j and a road-side unit to be reached through the cluster head on-board unit j, $C_j$ represents a congestion degree of the cluster head on-board unit j, $S_j$ represents a vehicle speed of the cluster head on-board unit j, and $S_c$ represents a speed of a vehicle where a current cluster head on-board unit belongs.

10. The method according to claim 9, wherein the next hop selection probability is determined by the following equation:

$$P_j = \frac{\delta_j^k}{\sum_j \delta_j^k},$$

wherein $P_j$ represents a probability of selecting the cluster head on-board unit j taken as the next hop to be a next hop node where data is to be forwarded, $\delta_j$ is a routing metric corresponding to the cluster head on-board unit j, and k is a constant not being zero.

11. An on-board unit, comprising: a radio transceiver configured to receive and send data; a memory storing computer-executable instructions; and a processor configured to execute the computer-executable instructions to perform a method in an Internet of Vehicles data transmission system, wherein the Internet of Vehicles data transmission system comprises a plurality of clusters and at least one road-side unit connected to the Internet, each cluster comprises at least one on-board unit, and the at least one on-board unit comprises a cluster head on-board unit, and the method comprises: transmitting data in the on-board unit to one of the at least one road-side unit, via the cluster head on-board unit of the cluster where the on-board unit belongs, wherein the transmitting the data in the on-board unit to one of the at least one road-side unit via the cluster head on-board unit of the cluster where the on-board unit belongs comprises: determining whether the on-board unit is the cluster head on-board unit; in response to determining that the on-board unit is not the cluster head on-board unit, forwarding the data to the cluster head on-board unit of the cluster, wherein each on-board unit stores an intra-cluster on-board unit status table for the cluster where the each on-board unit belongs, the intra-cluster on-board unit status table comprises status parameters of all on-board units in the cluster, wherein one of the plurality of clusters comprises a plurality of on-board units, and a non-cluster head on-board unit in the plurality of on-board units is reselected as the cluster head on-board unit of the cluster based on the status parameters and according to a new cluster head selection probability, wherein the new cluster head selection probability is determined according to the following equation:

$$\sigma_i = \gamma \frac{P_{c_i} T_{c_i}}{D_{v_i r}(\alpha + S_i - S_{avg})^2)},$$

$$P_i = \frac{\sigma_i^k}{\sum_i (\sigma_i^k)},$$

where $P_i$ represents a new cluster head selection probability of reselecting an intra-cluster on-board unit i to be a cluster head on-board unit, a represents a state metric of the intra-cluster on-board unit i, $\alpha$ and $\gamma$ are constants not being zero, $P_{c_i}$ represents a data processing capability of the on-board unit i, $T_{c_i}$ represents a data forwarding capability of the on-board unit i, $D_{v_i r}$ represents a distance between the on-board unit i and a nearest road-side unit, Si represents a speed of a vehicle where the on-board unit i belongs, and $S_{avg}$ represents an average speed of the vehicles where all the vehicle units belong in the cluster where the on-board unit i belongs.

12. A method performed in an Internet of Vehicles data transmission system, wherein the Internet of Vehicles data transmission system comprises a plurality of clusters and at least one road-side unit connected to the Internet, each cluster comprises at least one on-board unit, and the at least one on-board unit comprises a cluster head on-board unit, and the method comprises:
transmitting data in the on-board unit to one of the at least one road-side unit, via the cluster head on-board unit of the cluster where the on-board unit belongs,
wherein the transmitting the data in the on-board unit to one of the at least one road-side unit via the cluster head on-board unit of the cluster where the on-board unit belongs comprises: determining whether the on-board unit is the cluster head on-board unit; in response to determining that the on-board unit is not the cluster head on-board unit, forwarding the data to the cluster head on-board unit of the cluster,
wherein the cluster head on-board unit of each cluster comprises a routing table and a surrounding cluster head status table,
wherein the routing table comprises at least one routing entry, each routing entry comprises a destination and a next hop node, and the surrounding cluster head status table comprises an identification number, a data processing capability, a data forwarding capability of each surrounding cluster head on-board unit, a speed of a vehicle where each surrounding cluster head on-board unit belongs, a distance between each surrounding cluster head on-board unit and at least one road-side unit and a congestion degree of each surrounding cluster head on-board unit,
wherein the method comprises:
in response to determining that the on-board unit is the cluster head on-board unit, searching the routing table to determine whether the routing table comprises the routing entry where the destination is a road-side unit of the at least one road-side unit;
in response to determining that the routing table comprises the routing entry where the destination is the road-side unit of the at least one road-side unit, determining whether the routing entry comprises an entry where the next hop node is one of the at least one road-side unit; and
in response to determining that the routing entry comprises the routing entry where the next hop node is one of the at least one road-side unit, forwarding data to the road-side unit,
in response to determining that the routing entry does not comprise the routing entry where the next hop node is one of the at least one road-side unit, selecting the cluster head on-board unit taken as the next hop node, based on the routing entry and according to a next hop selection probability,
wherein the routing table further comprises a routing metric corresponding to the cluster head on-board unit taken as the next hop node, the routing metric is determined according to the following equation:

$$\delta_j = \lambda \frac{P_{cj} T_{cj}}{D_{v_j r} C_j (\tau + (S_j - S_c)^2)},$$

wherein $\delta_j$ represents a routing metric corresponding to a cluster head on-board unit j taken as the next hop node, $\lambda$ and $\tau$ are constants not being zero; $P_{cj}$ and $T_{cj}$ respectively represent a data processing capability and a data forwarding capability of the cluster head on-board unit j; $D_{v_j r}$ represents a distance between the cluster head on-board unit j and a road-side unit to be reached through the cluster head on-board unit j, $C_j$ represents a congestion degree of the cluster head on-board unit j, $S_j$ represents a vehicle speed of the cluster head on-board unit j, and $S_c$ represents a speed of a vehicle where a current cluster head on-board unit belongs.

\* \* \* \* \*